US008458166B2

(12) United States Patent
Bent et al.

(10) Patent No.: US 8,458,166 B2
(45) Date of Patent: Jun. 4, 2013

(54) DYNAMIC CONTEXT DEFINITIONS IN DISTRIBUTED DATABASES

(75) Inventors: Graham A. Bent, Southampton (GB); Patrick Dantressangle, Ford (GB); David R. Vyvyan, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 12/248,241

(22) Filed: Oct. 9, 2008

(65) Prior Publication Data

US 2011/0173219 A1 Jul. 14, 2011

(51) Int. Cl.
*G06F 17/30* (2006.01)

(52) U.S. Cl.
USPC .......................................... 707/713; 707/759

(58) Field of Classification Search
USPC ................ 707/713–721, 705; 706/12–14, 19, 706/21, 45–61
See application file for complete search history.

(56) References Cited

U.S. PATENT DOCUMENTS

| | | | |
|---|---|---|---|
| 5,201,046 A * | 4/1993 | Goldberg et al. ..................... | 1/1 |
| 5,418,950 A | 5/1995 | Li et al. | |
| 5,701,453 A | 12/1997 | Maloney et al. | |
| 5,794,229 A | 8/1998 | French et al. | |
| 5,873,088 A * | 2/1999 | Hayashi et al. ....................... | 1/1 |
| 5,937,402 A | 8/1999 | Pandit | |
| 6,016,497 A | 1/2000 | Suver | |
| 6,226,788 B1 | 5/2001 | Schoening et al. | |
| 6,457,007 B1 | 9/2002 | Kikuchi et al. | |
| 6,694,306 B1 * | 2/2004 | Nishizawa et al. ........... | 707/714 |
| 6,708,186 B1 | 3/2004 | Claborn et al. | |
| 6,950,823 B2 | 9/2005 | Amiri et al. | |
| 7,251,653 B2 | 7/2007 | Huang et al. | |
| 7,403,956 B2 | 7/2008 | Vaschillo et al. | |
| 7,664,758 B1 * | 2/2010 | Urano et al. ............... | 707/999.1 |
| 7,752,213 B2 | 7/2010 | Todd | |
| 7,921,131 B2 | 4/2011 | Uppala | |
| 7,974,961 B2 | 7/2011 | Barbarek | |
| 8,051,213 B2 | 11/2011 | Van Hensbergen et al. | |
| 2004/0044727 A1 | 3/2004 | Abdelaziz et al. | |

(Continued)

OTHER PUBLICATIONS

United States Patent and Trademark Office, Office Action for U.S. Appl. No. 12/248,082, Jan. 4, 2011, pp. 1-19, Alexandria, VA, USA.

(Continued)

*Primary Examiner* — Son T Hoang
*Assistant Examiner* — Keith C Yuen
(74) *Attorney, Agent, or Firm* — Lee Law, PLLC; Christopher B. Lee (57) ABSTRACT

A database query is received including a logical table identifier at a distributed database node within a distributed network of databases. The logical table identifier includes a dynamically-updatable constant column identifier. Local logical table definitions are filtered based upon the logical table identifier and the dynamically-updatable constant column identifier to identify a local logical table associated with the logical table identifier and the dynamically-updatable constant column identifier. A local query response is formed including data retrieved from a local physical database table mapped by the local logical table in response to identifying the local logical table associated with the logical table identifier and the dynamically-updatable constant column identifier. The database query is responded to, in response to forming the local query response, with at least the local query response. This abstract is not to be considered limiting, since other embodiments may deviate from the features described in this abstract.

18 Claims, 5 Drawing Sheets

U.S. PATENT DOCUMENTS

| | | | |
|---|---|---|---|
| 2005/0065925 | A1* | 3/2005 | Weissman et al. .............. 707/4 |
| 2005/0096124 | A1 | 5/2005 | Stronach |
| 2005/0138073 | A1 | 6/2005 | Zhou et al. |
| 2005/0182758 | A1 | 8/2005 | Seitz et al. |
| 2005/0223022 | A1 | 10/2005 | Weissman et al. |
| 2005/0246338 | A1 | 11/2005 | Bird |
| 2006/0004750 | A1 | 1/2006 | Huang et al. |
| 2006/0053112 | A1 | 3/2006 | Chitikara et al. |
| 2006/0136363 | A1 | 6/2006 | Nguyen et al. |
| 2006/0136469 | A1 | 6/2006 | Dettinger et al. |
| 2006/0225072 | A1* | 10/2006 | Lari et al. .............. 717/175 |
| 2006/0294065 | A1 | 12/2006 | Dettinger |
| 2007/0002869 | A1 | 1/2007 | Miller |
| 2007/0143369 | A1 | 6/2007 | Uppala |
| 2009/0063453 | A1 | 3/2009 | Adler et al. |
| 2009/0063524 | A1 | 3/2009 | Adler et al. |
| 2009/0193006 | A1 | 7/2009 | Herrnstadt |

OTHER PUBLICATIONS

United States Patent and Trademark Office, Office Action for U.S. Appl. No. 12/248,082, Apr. 27, 2011, pp. 1-22, Alexandria, VA, USA.

United States Patent and Trademark Office, Office Action for U.S. Appl. No. 12/248,140, Apr. 13, 2011, pp. 1-15, Alexandria, VA, USA.

United States Patent and Trademark Office, Office Action for U.S. Appl. No. 12/248,170, Mar. 17, 2011, pp. 1-12, Alexandria, VA, USA.

United States Patent and Trademark Office, Office Action for U.S. Appl. No. 12/248,109, Mar. 1, 2011, pp. 1-13, Alexandria, VA, USA.

United States Patent and Trademark Office, Office Action for U.S. Appl. No. 12/248,304, Apr. 1, 2011, pp. 1-19, Alexandria, VA, USA.

United States Patent and Trademark Office, Office Action for U.S. Appl. No. 12/248,109, Sep. 1, 2011, pp. 1-20, Alexandria, VA, USA.

United States Patent and Trademark Office, Office Action for U.S. Appl. No. 12/248,140, Oct. 13, 2011, pp. 1-18, Alexandria, VA, USA.

United States Patent and Trademark Office, Office Action for U.S. Appl. No. 12/248,170, Sep. 30, 2011, pp. 1-18, Alexandria, VA, USA.

United States Patent and Trademark Office, Office Action for U.S. Appl. No. 12/248,304, Sep. 19, 2011, pp. 1-25, Alexandria, VA, USA.

Boon-Chong Seet, et al., Route discovery optimization for dynamic source routing in mobile ad hoc networks, Article, Sep. 15, 2000, pp. 1-7, School of Computer Engineering, Nanyang Technological University, Singapore.

United States Patent and Trademark Office, Notice of Allowance for U.S. Appl. No. 12/248,082, Nov. 30, 2011, pp. 1-14, Alexandria, VA, USA.

United States Patent and Trademark Office, Office Action for U.S. Appl. No. 12/248,109, Dec. 7, 2011, pp. 1-18, Alexandria, VA, USA.

Roy Morien, Agile Development of the Database: A Focal Entity Prototyping Approach, Proceedings of the Agile Development Conference (ADC '05), 2005, pp. 103-110 (1-8), IEEE Computer Society, Published on the World Wide Web.

Joseph Sack, SQL Server 2008 Transact-SQL Recipes: Chapter 4—Tables, Book, Jul. 25, 2008, pp. 143-195, Springer-Verlag New York, Inc., New York, NY, USA.

United States Patent and Trademark Office, Office Action for U.S. Appl. No. 12/248,304, Jun. 19, 2012, pp. 1-21, Alexandria, VA, USA.

United States Patent and Trademark Office, Office Action for U.S. Appl. No. 13/364,728, Jun. 12, 2012, pp. 1-34, Alexandria, VA, USA.

United States Patent and Trademark Office, Notice of Allowance for U.S. Appl. No. 12/248,140, Jun. 21, 2012, pp. 1-30, Alexandria, VA, USA.

United States Patent and Trademark Office, Office Action for U.S. Appl. No. 12/248,109, May 8, 2012, pp. 1-22, Alexandria, VA, USA.

United States Patent and Trademark Office, Notice of Allowance for U.S. Appl. No. 12/248,170, May 24, 2012, pp. 1-24, Alexandria, VA, USA.

United States Patent and Trademark Office, Notice of Allowance for U.S. Appl. No. 12/248,109, Jan. 25, 2013, pp. 1-19, Alexandria, VA, USA.

United States Patent and Trademark Office, Office Action for U.S. Appl. No. 12/248,304, Jan. 17, 2013, pp. 1-17, Alexandria, VA, USA.

United States Patent and Trademark Office, Office Action for U.S. Appl. No. 13/364,728, Nov. 8, 2012, pp. 1-31, Alexandria, VA, USA.

United States Patent and Trademark Office, Office Action for U.S. Appl. No. 13/561,659, Feb. 15, 2013, pp. 1-34, Alexandria, VA, USA.

* cited by examiner

DYNAMIC CONTEXT DEFINITIONS IN DISTRIBUTED DATABASES

This invention was made with Government support under W911NF-06-3-0001 awarded by United States Army. The Government has certain rights to this invention.

RELATED APPLICATIONS

This application is related to the application titled "AUTOMATED PROPAGATION OF NON-CONFLICTING QUERIES IN DISTRIBUTED DATABASES," filed contemporaneously herewith on Oct. 9, 2008 and assigned application Ser. No. 12/248,082, to the application titled "AUTOMATED DATA SOURCE ASSURANCE IN DISTRIBUTED DATABASES," filed contemporaneously herewith on Oct. 9, 2008 and assigned application Ser. No. 12/248,109, to the application titled "AUTOMATED DATA CONVERSION AND ROUTE TRACKING IN DISTRIBUTED DATABASES," filed contemporaneously herewith on Oct. 9, 2008 and assigned application Ser. No. 12/248,140, to the application titled "AUTOMATED QUERY PATH REPORTING IN DISTRIBUTED DATABASES," filed contemporaneously herewith on Oct. 9, 2008 and assigned application Ser. No. 12/248,170, and to the application titled "NODE-LEVEL SUB-QUERIES IN DISTRIBUTED DATABASES," filed contemporaneously herewith on Oct. 9, 2008 and assigned application Ser. No. 12/248,304, each of which is hereby incorporated by reference as if fully set forth herein.

This application is also related to the application titled "AN APPARATUS FOR PROPAGATING A QUERY," filed in the United Kingdom on Sep. 19, 2007, with application serial number 0718251.2, the application titled "AN APPARATUS FOR STORING A LOGICAL STATEMENT," filed in the United Kingdom on Sep. 19, 2007, with application serial number 0718214.0, and the application titled "AN APPARATUS FOR ENABLING CONNECTIONS," filed in the United Kingdom on Sep. 19, 2007, with application serial number 0718248.8 and filed within the United States on Apr. 11, 2008, with application Ser. No. 12/101,220, each of which is hereby incorporated by reference as if fully set forth herein.

BACKGROUND OF THE INVENTION

1. Field of the Invention

The present invention relates to systems and methods for filtering data retrieval in queries in ad-hoc distributed database systems. More particularly, the present invention relates to dynamic context definitions in distributed databases.

2. Related Art

Distributed databases include multiple databases accessible via a network or other interconnection by a querying computing node. The distributed databases may be logically distributed across multiple access or network domains and may be geographically distributed across physical locations. The querying computing node often uses a centralized registry to identify databases and physical data structures within the identified databases. The physical data structures are identified and accessible globally by name. Queries are issued to an identified database using an identified global name of a physical data structure. Query results are returned from the identified database in response to the issued query.

BRIEF SUMMARY OF THE INVENTION

The subject matter described herein provides dynamic context definitions in distributed databases. Dynamic context allows for managing and organizing nodes into clusters for task delegation, semantic enrichment, routing, and other activities in ad-hoc distributed database system during runtime without taking a database node out of service. For purposes of the present subject matter, "ad-hoc" encompasses systems that are fit for purposes of the present subject matter with any kind of connection strategy that may be employed. A logical data structure (e.g., table) identifier including a dynamically-updatable constant column identifier is transmitted in association with a distributed database query. Upon receipt of the query, a distributed database node filters local logical table definitions using the logical table identifier and the dynamically-updatable constant column identifier. In response to identifying a matching local logical table named with the logical table identifier that has a column named with the dynamically-updatable constant column identifier, the node forms a local query response including data retrieved from a local physical database table mapped by the local logical table and responds with the local query response. Constant columns may be dynamically updated (e.g., added, changed, or removed, etc.) along with any associated data values during runtime without taking the database node out of service. Database groups may be defined and dissolved. Constant column and associated data value modifications along with group formation and dissolution may be performed via stored procedures associated with an application programming interface (API) to preserve the autonomy and independence of each distributed database node. Each node may then be able to query a logical table to obtain a list of currently used context names and context group names, and the semantics associated with them, to make a decision about which constant columns to define and which groups to join or leave.

A method includes receiving a database query comprising a logical table identifier at a distributed database node within a distributed network of databases, where the logical table identifier comprises a dynamically-updatable constant column identifier; filtering local logical table definitions based upon the logical table identifier and the dynamically-updatable constant column identifier to identify a local logical table associated with the logical table identifier and the dynamically-updatable constant column identifier; forming a local query response to the database query comprising data retrieved from a local physical database table mapped by the local logical table in response to identifying the local logical table associated with the logical table identifier and the dynamically-updatable constant column identifier; and responding to the database query, in response to forming the local query response, with the local query response.

A system includes a memory adapted to store context information for logical queries; and a processor programmed to: receive a database query comprising a logical table identifier at a distributed database node within a distributed network of databases, where the logical table identifier comprises a dynamically-updatable constant column identifier; filter local logical table definitions based upon the logical table identifier and the dynamically-updatable constant column identifier to identify a local logical table associated with the logical table identifier and the dynamically-updatable constant column identifier; form a local query response to the database query comprising data retrieved from a local physical database table mapped by the local logical table in response to identifying the local logical table associated with the logical table identifier and the dynamically-updatable constant column identifier; store the local query response to the memory; and respond to the database query, in response to forming the local query response, with the local query response.

An alternative system includes a memory adapted to store context information for logical queries; and a processor programmed to: receive a database query comprising a logical table identifier at a distributed database node within a distributed network of databases, where the logical table identifier comprises a dynamically-updatable constant column identifier, filter local logical table definitions based upon the logical table identifier and the dynamically-updatable constant column identifier to identify a local logical table associated with the logical table identifier and the dynamically-updatable constant column identifier, and in response to identifying the local logical table associated with the logical table identifier and the dynamically-updatable constant column identifier: form a local query response to the database query comprising data retrieved from a local physical database table mapped by the local logical table, store the local query response to the memory, create a constant column associated with the local logical table with a group name as a column name for the constant column and at least one other node identifier as a data value for the constant column in response to the logical query identifier further comprising a group formation indicator identifying the group name and the at least one other node identifier representing at least one other node to be associated with the distributed database node as a database group, add a group formation acknowledgement to the local query response, and respond to the database query with the local query response.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides dynamic context definitions in distributed databases. Dynamic context allows for managing and organizing nodes into clusters for task delegation, semantic enrichment, routing, and other activities in ad-hoc distributed database system during runtime without taking a database node out of service. For purposes of the present subject matter, "ad-hoc" encompasses systems that are fit for purposes of the present subject matter with any kind of connection strategy that may be employed. A logical data structure (e.g., table) identifier including a dynamically-updatable constant column identifier is transmitted in association with a distributed database query. Upon receipt of the query, a distributed database node filters local logical table definitions using the logical table identifier and the dynamically-updatable constant column identifier. In response to identifying a matching local logical table named with the logical table identifier that has a column named with the dynamically-updatable constant column identifier, the node forms a local query response including data retrieved from a local physical database table mapped by the local logical table and responds with the local query response. Constant columns may be dynamically updated (e.g., added, changed, or removed, etc.) along with any associated data values during runtime without taking the database node out of service. Database groups may be defined and dissolved. Constant column and associated data value modifications along with group formation and dissolution may be performed via stored procedures associated with an application programming interface (API) to preserve the autonomy and independence of each distributed database node. Each node may then be able to query a logical table to obtain a list of currently used context names and context group names, and the semantics associated with them, to make a decision about which constant columns to define and which groups to join or leave.

The dynamic context definitions in distributed databases described herein may be performed in real time to allow prompt filtering of distributed database queries based upon logical table identifiers and dynamically-updatable constant columns associated with distributed logical table definitions. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on demand information processing acceptable to a user of the subject matter described (e.g., within a few seconds or less than ten seconds or so in certain systems). These terms, while difficult to precisely define are well understood by those skilled in the art.

Figure 1:
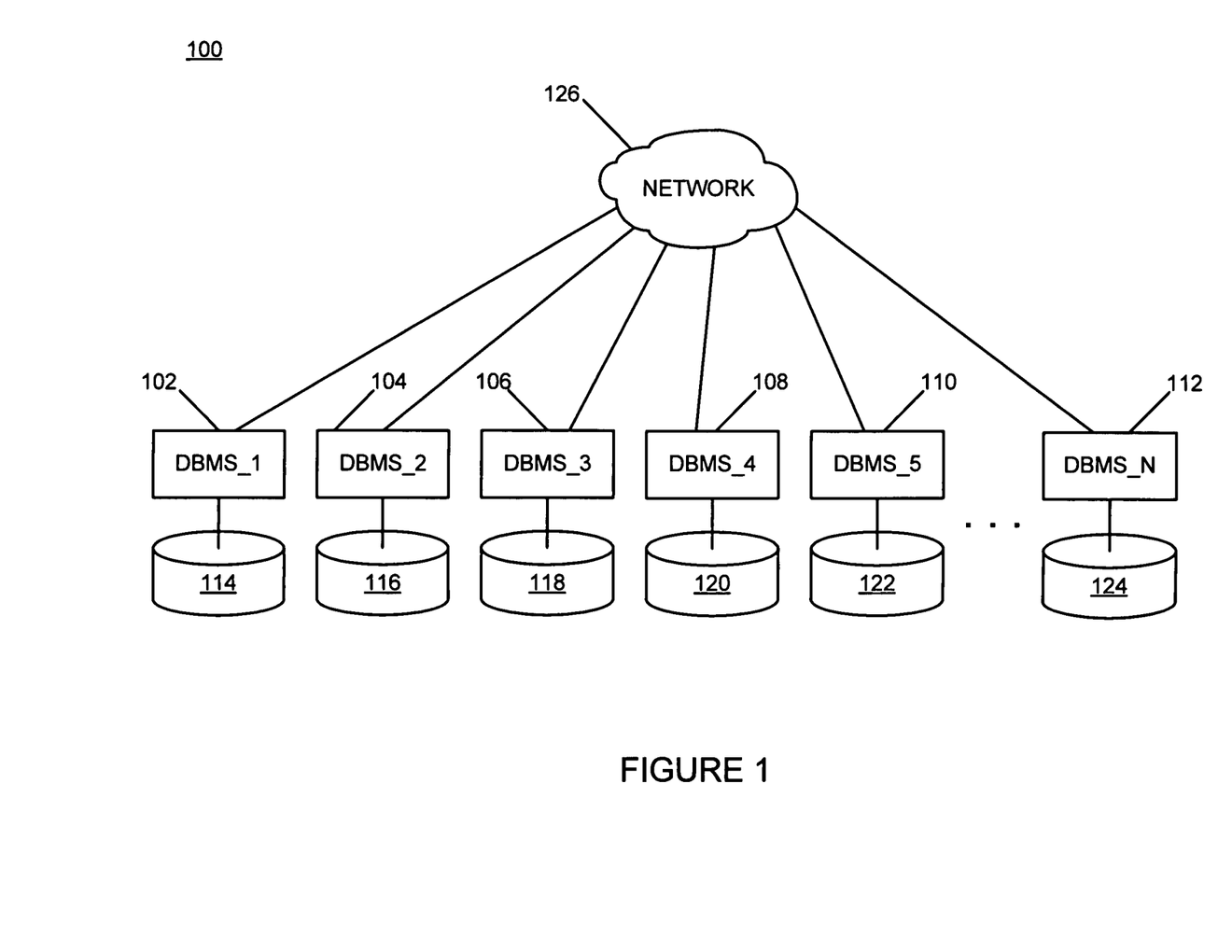
FIG. 1 is a block diagram of an example of an implementation of a system for providing dynamic context for queries in distributed databases according to an embodiment of the present subject matter.

FIG. 1 is a block diagram of an example of an implementation of a system 100 for providing dynamic context definitions in distributed databases. Within the system 100, a database management system_1 (DBMS_1) 102, a DBMS_2 104, a DBMS_3 106, a DBMS_4 108, a DBMS_5 110, up to a DBMS_N 112 are illustrated. The DBMS_1 102 through the DBMS_N 112 are each associated with a database 114, a database 116, a database 118, a database 120, a database 122, up to a database 124, respectively. The DBMS_1 102 through the DBMS_N 112 are interconnected via a network 126.

For purposes of the present description, it should be noted that while the network 126 is illustrated as interconnecting the DBMS_1 102 through the DBMS_N 112 with each other, this should not be considered limiting. The network 126 may be formed by any interconnection appropriate for use in a distributed database environment. For example, the network 126 may include any form of interconnection suitable for the intended purpose, including a private or public network such as an intranet or the Internet, respectively, direct inter-module interconnection, dial-up, or any other interconnection mechanism capable of interconnecting the devices with the system 100.

As such, any two or more of the DBMS_1 102 through the DBMS_N 112 may be interconnected by proximity, interconnection, or routing capabilities within the system 100, while certain other of the devices may not have interconnectivity other than via other distributed database devices. Accordingly, certain of the DBMS_1 102 through the DBMS_N 112 may not be capable of communication with one another other than via the other distributed database devices.

As will be described in more detail below in association with FIGS. 2 through 6 below, the DBMS_1 102 through the DBMS_N 112 provide dynamic context definitions within the system 100. The dynamic context definitions in distributed databases is based upon propagation of a logical table identifier including a dynamically-updatable constant column identifier in association with database queries.

It should be noted that the DBMS_1 102 through the DBMS_N 112 may be any type of device configurable for storage of information and distributed interconnectivity for database-style queries. For example, the DBMS_1 102 through the DBMS_N 112 may include devices such as a personal computer (e.g., desktop, laptop, palm, etc.) or a handheld device (e.g., cellular telephone, personal digital assistant (PDA), email device, music recording or playback device, etc.), or any other device capable of processing information as described above and in more detail below.

Figure 2:
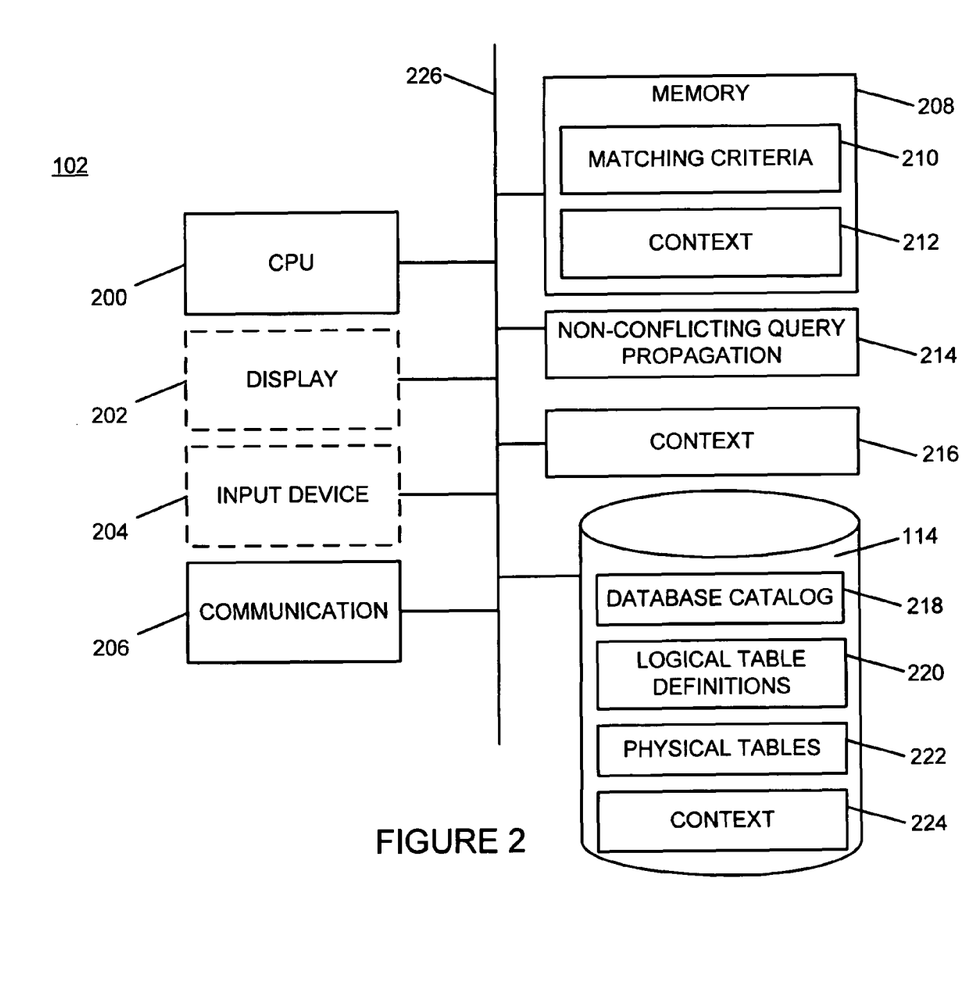
FIG. 2 is a block diagram of an example of an implementation of a database management system that is capable of providing dynamic context for queries based upon propagation of a logical table identifier including a dynamically-updatable constant column identifier in association with a database query within a distributed database system according to an embodiment of the present subject matter.

FIG. 2 is a block diagram of an example of an implementation of the DBMS_1 102 that is capable of providing dynamic context for queries based upon propagation of a logical table identifier including a dynamically-updatable constant column identifier in association with a database query within a distributed database system, such as the system 100. A central processing unit (CPU) 200 provides computer instruction execution, computation, and other capabilities within the DBMS_1 102. A display 202 provides visual information to a user of the DBMS_1 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

It should be noted that the display 202 and the input device 204 are illustrated with a dashed-line representation within FIG. 2 to indicate that they are not required components for the DBMS_1 102. Accordingly, the DBMS_1 102 may operate as a completely automated embedded device without user configurability or feedback. However, the DBMS_1 102 may also provide user feedback and configurability via the display 202 and the input device 204, respectively.

A communication module 206 provides interconnection capabilities that allow the DBMS_1 102 to communicate with other modules within the system 100, such as the DBMS_2 104 through the DBMS_N 112, to provide dynamic context definitions within the system 100. The communication module 206 may include any electrical, protocol, and protocol conversion capabilities useable to provide the interconnection capabilities.

A memory 208 includes a matching criteria storage area 210 that stores information usable to identify processing preferences or priorities for dynamic context for queries within the system 100. The matching criteria stored within the matching criteria storage area 210 are used to configure and control query data selection and processing, query forwarding, and query responses. The memory 208 also includes a context information storage area 212 that stores context information usable to provide dynamic context definitions within the system 100. As will be described in more detail below, the context information stored within the context information storage area 212 is used to store logical table identifiers, node identifiers, dynamically-updatable constant column identifiers, and other information associated with dynamic context definitions within the system 100. The context information may also be used to identify nodes that form query processing groups within to the system 100.

A non-conflicting query propagation module 214 is illustrated. The non-conflicting query propagation module 214 provides query processing, query forwarding, and query response capabilities for the DBMS_1 102. A context module 216 is also illustrated. The context module 216 provides the capabilities for implementing dynamic context definitions for distributed database devices, such as the DBMS_1 102, as described above and in more detail below.

Though the communication module 206, the non-conflicting query propagation module 214, and the context module 216 are illustrated as component-level modules for ease of illustration and description purposes, it should be noted that these modules include any hardware, programmed processor(s), and memory used to carry out the respective functions of the modules as described above and in more detail below. For example, the communication module 206, the non-conflicting query propagation module 214, and the context module 216 may include additional controller circuitry in the form of application specific integrated circuits (ASICs), processors, antennas, and/or discrete integrated circuits and components for performing communication and electrical control activities associated with the respective modules. Additionally, the communication module 206, the non-conflicting query propagation module 214, and the context module 216 also include interrupt-level, stack-level, and application-level modules as appropriate. Furthermore, these modules include any memory components used for storage, execution, and data processing for performing processing activities associated with the respective modules. The communication module 206, the non-conflicting query propagation module 214, and the context module 216 may also form a portion of other circuitry described without departure from the scope of the present subject matter.

The database 114 provides storage capabilities for information associated with the automated propagation of database queries and dynamic context definitions capabilities of the DBMS_1 102. The database 114 includes a database catalog storage area 218, a logical table definition storage area 220, a physical table storage area 222, and a context storage area 224 that may be stored in the form of tables or other arrangements accessible by the DBMS_1 102.

The database catalog storage area 218 stores information associated with logical tables stored at other database management systems, such as the DBMS_2 104 through the DBMS_N 112, within the system 100. The information stored within the database catalog storage area 218 may be compiled in response to queries of other database nodes within the system 100 for logical table definitions stored at those other nodes. As such, the DMBS_1 102 may determine and store logical table definitions for other nodes within the system 100 for use during query processing.

The logical table definition storage area 220 stores information about logical tables stored locally to the DBMS_1 102. The logical tables map to physical data and physical tables stored within the physical table storage area 222. The physical table storage area 222 stores physical tables that may or may not be federated within a distributed database system, such as the system 100, based upon mappings defined within the respective logical table definition storage area 220.

The context storage area 224 stores information associated with the context and query processing groups for distributed database queries as identified by the context module 216. As will be described in more detail below beginning with FIG. 3, logical table identifiers including dynamically-updatable constant column identifiers are associated with database queries. Upon receipt of a database query, the receiving distributed database node, such as the DBMS_1 102, filters local logical table definitions based upon the logical table identifier and the dynamically-updatable constant column identifier to identify a local logical table associated with the logical table identifier and the dynamically-updatable constant column identifier. The DBMS_1 102 analyzes constant columns of local logical tables and associated dynamically-updatable values associated with the constant columns to identify a matching local logical table. Upon identification of a matching local logical table, a query response is formed using data retrieved from a local physical database table mapped by the local logical table. The DBMS_1 102 responds with the local query response. Query processing groups may be created and deleted by adding and deleting additional constant columns associated with logical tables.

For purposes of the present subject matter, the originating node or any intermediate node may process received and locally-created query responses for context purposes. Any received or local query responses may further be stored within the context storage area 224 at any distributed database node and may be forwarded to other distributed database nodes to for processing to further distribute dynamic context for query responses.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

The CPU 200, the display 202, the input device 204, the communication module 206, the memory 208, the non-conflicting query propagation module 214, the context module 216, and the database 114 are interconnected via an interconnection 226. The interconnection 226 may include a system bus, a network, or any other interconnection capable of providing the respective components with suitable interconnection for the respective purpose.

While the DBMS_1 102 is illustrated with and has certain components described, other modules and components may be associated with the DBMS_1 102 without departure from the scope of the present subject matter. Additionally, it should be noted that, while the DBMS_1 102 is described as a single device for ease of illustration purposes, the components within the DBMS_1 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the DBMS_1 102 are possible and all are considered within the scope of the present subject matter. It should also be understood that, though the database catalog storage area 218, the logical table definition storage area 220, the physical table storage area 222, and the context storage area 224 are shown within the database 114, they may also be stored within the memory 208 without departure from the scope of the present subject matter. Accordingly, the DBMS_1 102 may take many forms and may be associated with many platforms.

Based upon the description above, dynamic context definitions in association with query processing will now be described. It is understood that any of the DBMS_1 104 through the DBMS_N 112 may originate a query for purposes of the following examples. An originated query may be propagated to one or more of the distributed database nodes from each node as the query progresses through the system 100. Responses to the query are propagated to the originating node for processing and/or may be processed by each node on the return path. Accordingly, many possibilities exist for providing dynamic context definitions processing and all are considered within the scope of the present subject matter.

To provide context for the following query examples, a distributed banking database system will be assumed. Within the example distributed banking database system, different account types may be defined to include, for example, "Checking," "Credit," and "Savings." Each account type may have its own dedicated database node or nodes, such as one of the DBMS_1 102 through the DBMS_N 112, to store data associated with the respective account type. Nodes that are associated with a given account type or query may be considered "participating" nodes. For purposes of the present example, a logical table is associated with participating nodes that is named "Accounts." The logical table named "Accounts" maps to one or more physical tables, such that certain information within the tables may be federated by a mapping within the logical table and certain other information may not be federated by not being mapped within the logical table.

Participating nodes will also have a constant column for the "Accounts" logical table named "AccountType." The "AccountType" constant column may hold a different value on each node to represent each account type (e.g., checking, credit, savings, etc.). Example data values for the "AccountType" constant column name include a value of "CK" to represent a checking account, a value of "CR" to represent a credit account, and a value of "SA" to represent a savings account.

Some account types may further be split into sub-types, e.g. "Savings Flexible," "Savings High Rate," where the high rate savings account requires a notice period on withdrawals to avoid a penalty charge. The associated data may again be split between a new set of database nodes using the grouping described in more detail below. Each of these nodes would have the same value "SA" for the "AccountType" field, and would also have a new constant column called "SavingsType" defined to distinguish the type of savings account, and include a value of "FL" to represent a flexible savings account and value of "HR" to represent a high-rate savings account.

Based upon this banking example, the following example Logical Table Definition) represents an example logical table definition format for one possible implementation of context associated with the example Query1 to be described below.

ACCOUNTS_DEF=
Name VARCHAR(20),
Balance INT,
DaysSinceWithdrawal INT,
AccountType CHAR(2) 'SA'—Constant Column
SavingsType CHAR(2) 'HR'—Constant Column
Example Logical Table Definition1

Based upon the above example column name values, the example Logical Table Definition) represents a high-rate savings account logical table definition. As can be seen from the example Logical Table Definition1, a logical table name is "Accounts" (e.g., "ACCOUNTS_DEF"). A "Name" and a "Balance" column are defined to hold data values for a name and balance of customer accounts within the respective rows of the logical table definition. A "DaysSinceWithdrawal" column is defined to hold data values representing the number of days since the last withdrawal to be used to enforce early withdrawal penalties. It can also be seen from the Example Logical Table Definition1 that an "AccountType" constant column and a "SavingsType" constant column are defined. The "AccountType" constant column holds a value of "SA" to represent that the logical table is associated with a savings account. The "SavingsType" constant column holds a value of "HR" to indicate that the logical table is associated with a high-rate savings account. As described above, the values stored in association with the "AccountType" constant column and a "SavingsType" constant column may be dynamically changed based upon data distribution and processing goals. Additionally, nodes may be grouped based upon column name definitions and the data values stored within the respective column name definitions. Nodes may communicate and negotiate for data distribution to identify opportunities to improve distributed data storage capabilities.

Regarding an example query format that may be used for dynamic context definitions, the following example Query1 represents a pseudo-query format for one possible implementation of a context-oriented logical-table based query. It should be understood that logical tables may be defined based upon logical table definitions, such as the example Logical Table Defintion1 described above.

select Name, Balance from logical table 'Accounts' as Accounts
    where SavingsType='HR' (Query1)

As can be seen from the pseudo-query format for the example Query1, a query is formed using a "select" query identifier. The identifiers following the select query identifier represents column names for the associated logical table. As such, the Query1 is a column name-based query. Within the present example, the Query1 requests data associated with columns named "Name" and "Balance." The Query1 instructs receiving distributed database nodes to use logical table definitions for fulfillment of the Query1 with the phrase "from logical table." The requested logical table identifier is shown within single quotation marks. As such, the Query1 requests data associated with a logical table named "Accounts." The second reference to "Accounts" within the Query1 is an alias to a composite name for the logical table, again listed as "Accounts" within the present example. As such, local logical tables may be filtered based upon the logical table name to identify potentially matching logical tables for processing. Additional filtering is described below for providing dynamic context definitions in distributed database systems, such as the system 100.

Regarding context, constant columns may be associated with logical table definitions throughout the system 100 to provide context for the defined logical tables. Constant columns may be considered annotations that define the context of a logical table. This context may be defined locally and independently for every distributed database node and utilized to define a global network definition for a given logical table. The global network definition for a given logical table may be defined at an infrastructure level or at an application level. At an infrastructure level, the global network definition for a given logical table may impact the routing of a query. For example, if a query has predicates on the constant columns, routing may be improved by processing the predicates prior to processing underlying physical data sources. At an application level, context may be interpreted as identity information for security purposes or to may be used to implement high availability solutions. Many other possible uses of context exist and all are considered within the scope of the present subject matter.

Based upon the description above, constant columns may be considered metadata for distributed logical table definitions. This metadata may be added to, modified, or removed from logical table definitions and used within queries based upon distributed data processing goals. Rows may be inserted into underlying tables of a logical table without new data values being generated and stored for the constant column. This may also improve data storage requirements. A logical table's constant column is constant for all data sources exposed by a node and mapped on to that logical table. At the network level, a constant column may represent network meta-data for a logical table, even though it is defined locally and independently for each node.

The constant columns form part of a definition of a logical table in addition to the standard columns mapped to physical data source columns on each node that exposes data for a given logical table. Each node contributing data to the logical table in a network of databases, such as the system 100, defines the respective logical table. Constant columns for a logical table may be defined dynamically. As such, the constant columns may be created, modified, or removed to add, change, or remove context associations for locally-defined logical tables at any distributed database node, such as the DBMS_1 102 through the DBMS_N 112.

Additionally, data values associated with the constant columns may be dynamically alterable based upon configuration and query processing indicators, as described in more detail below. Queries include dynamically-updatable constant column identifiers that reference constant columns to provide dynamic context definitions in distributed databases for logical tables within the system 100. Nodes determine whether to process a query based upon filtering of received database queries based upon the received dynamically-updatable constant column identifiers to identify context matches for received distributed database queries. Database groups may be defined and dissolved by adding group formation indicators or group dissolution indicators, respectively, to the logical table identifier.

Returning to the description of the example Query1, the Query1 is further refined by the addition of a "where" operator that specifies matching criteria for further filtering of local logical tables. Within the present example, the "where" operator is followed by the phrase "SavingsType='HR'." The term "SavingsType" represents a dynamically-updatable constant column identifier. This dynamically-updatable constant column identifier may be used to further filter any locally-defined logical table that has the name "Accounts." As described above, the term "HR" represents a high-rate savings account type within the present example. A high-rate saving account may have additional constraints, as described in more detail below, such as a minimum number of days between withdrawals. With inclusion of this additional context information within a query, such as the example Query1, local logical tables may be filtered based upon the received logical table identifier for non-conflicting query purposes and further filtered based upon the received dynamically-updatable constant column identifier for dynamic context purposes.

As described above, the dynamic context for queries associated with the present subject matter allows logical queries to be refined based upon context associated with a query within a distributed database system, such as the system 100. As such, using a query format such as the pseudo-query format of the example Query1, a dynamically-updatable constant column identifier may be distributed with a logical table identifier. The logical table identifier may be used by distributed database nodes to process a dynamic context definition for a query and the dynamically-updatable constant column identifier may be used to apply context for filtering of query processing at distributed database nodes. As described above and in more detail below, database groups may be defined and dissolved by adding group formation indicators or group dissolution indicators, respectively, to the logical table identifier. As such, using a logical table context-based database query format, certain data within physical database tables may be federated while other data may be maintained privately within the respective physical database tables. The dynamically-updatable constant column identifier instructs database nodes that receive a query to filter the received query using the dynamically-updatable constant column identifier as a context enforcement operation for the query.

As another example, context associated with logical table definitions may also be used to define or dissolve database processing groups. To promote autonomy and independence of the distributed database nodes, stored procedures associated with an application programming interface (API) may be used by each node for dynamic updating of columns and values associated with local logical tables. The API procedures may be used by each node to query a logical table to obtain a list of currently used context names and context group names, and the semantics associated with them, to make a decision about which constant columns to define and which groups to join or leave. Alternatively, group formation indicators and group dissolution indicators may be communicated with a query in association with a logical table definition. Groups may be established or dissolved during the course of processing a distributed database queries without requiring an administrator to take down a database node, make the changes, and bring the node back onto the network. This dynamic configurability provided by the dynamic context definitions in distributed databases provides flexibility of configuration of a distributed network of databases without downtime associated with taking a distributed node off of the network. It may also be assumed for purposes of a group formation and dissolution activity that a node that originated a query has knowledge of the distribution of logical table definitions and grouping within the system 100.

Accordingly, context in association with logical table-based queries provides dynamic configuration and control capabilities within the system 100 by allowing a logical table definition to be dynamically modified by addition, modification, or removal of constant columns to expose underlying data sources in many different ways. Many other possibilities exist for distribution of context and context-related instructions in association with logical table-based queries. Accordingly, all such possibilities are considered within the scope of the present subject matter.

It should be noted that for purposes of the present description, a virtual table interface may be formed based upon the logical table definitions. The virtual table interface may be defined as a set of interfaces for representation of physical data for encapsulation and abstraction of the physical data within a distributed network of databases, such as the system 100. Class definitions may be constructed for creation and representation of the logical table definitions. For example, a class for a query may be defined in a syntactic representation, such as Java, to accept logical table name as an argument of a class constructor. A logical table definition may also be passed as a second argument to the class constructor. Upon instantiation, a query object may be created with the logical table name and definition associated with the query object. Distributed database nodes may make calls into the query object for logical table information and processing.

It should be noted that though the example Query1 does not include communicated matching criteria, it is understood that the Query1 may be modified to include matching criteria without departure from the scope of the present subject matter. Further, matching criteria may be either communicated with a query or may be stored locally in advance of issuance of a query. As such, default matching criteria may be established and stored within the matching criteria storage area 210 of the memory 208 at each distributed database node. For example, default matching may be strict matching for column name, column position within a logical table, column name data type, column name data precision, and other factors. Issued queries may modify default matching criteria to pass additional or alternative matching criteria instructing the receiving distributed database nodes to match based upon the additional matching criteria or to change default matching criteria. Example additional or alternative matching criteria include matching a column name in any position of a logical table, matching data precision based upon equal or greater precision within the respective logical table definitions, and other matching criteria. There are many other possible matching criteria that may be used and all are considered within the scope of the present subject matter.

Figure 3:
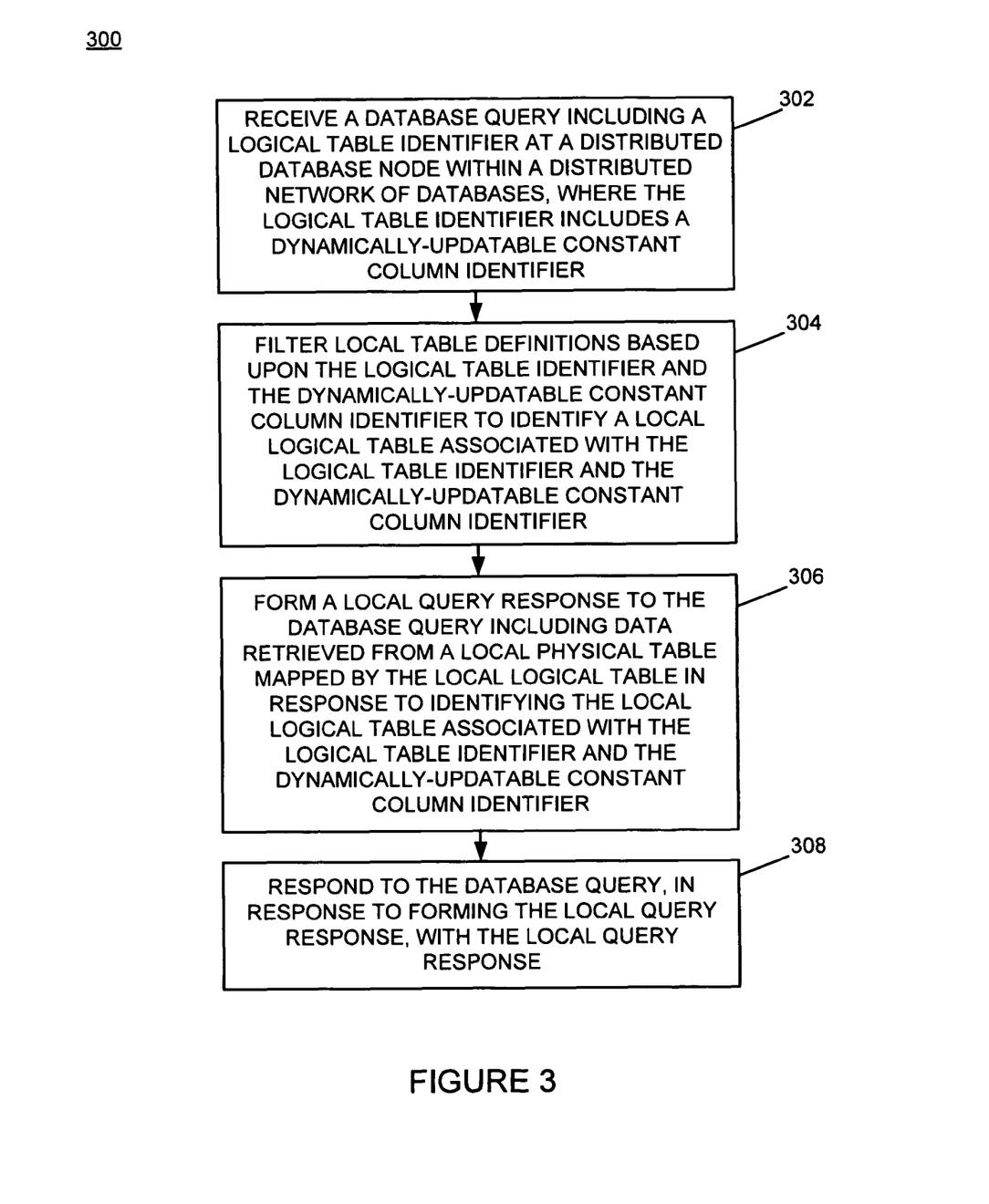
FIG. 3 is a flow chart of an example of an implementation of a process for providing dynamic context for queries in distributed databases.
Figure 4:
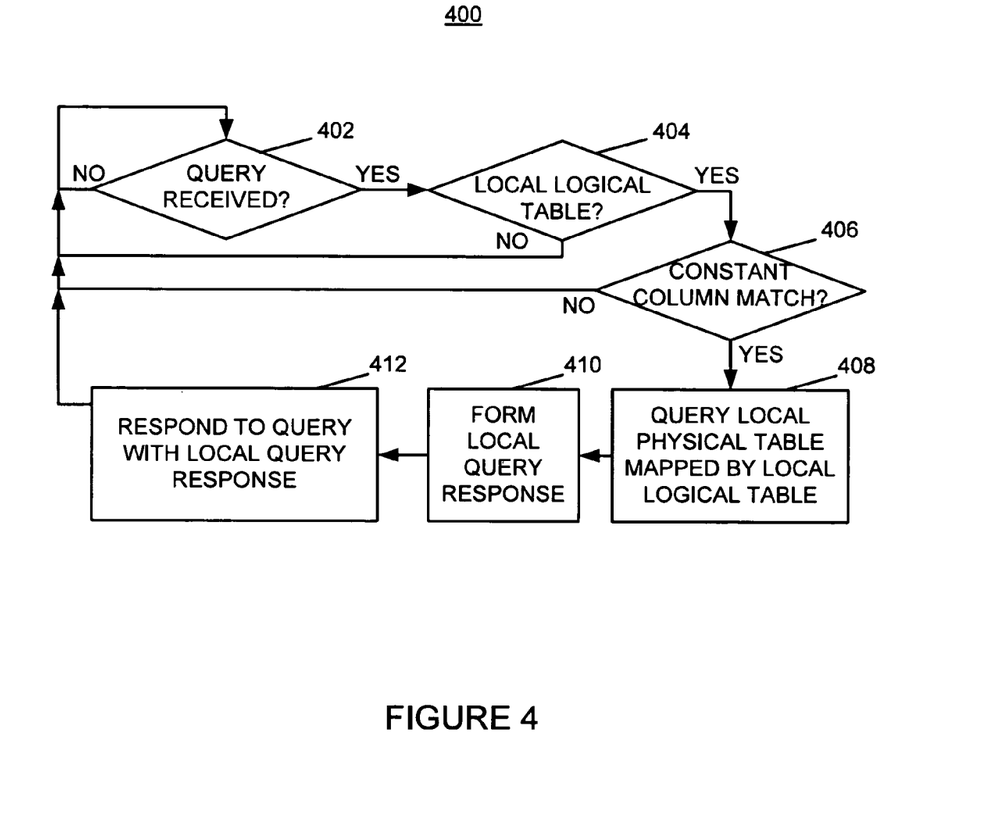
FIG. 4 is a flow chart of an example of an implementation of a process for providing context for processing dynamic context definitions in distributed databases based upon processing of constant columns associated with local logical table definitions according to an embodiment of the present subject matter.
Figure 5:
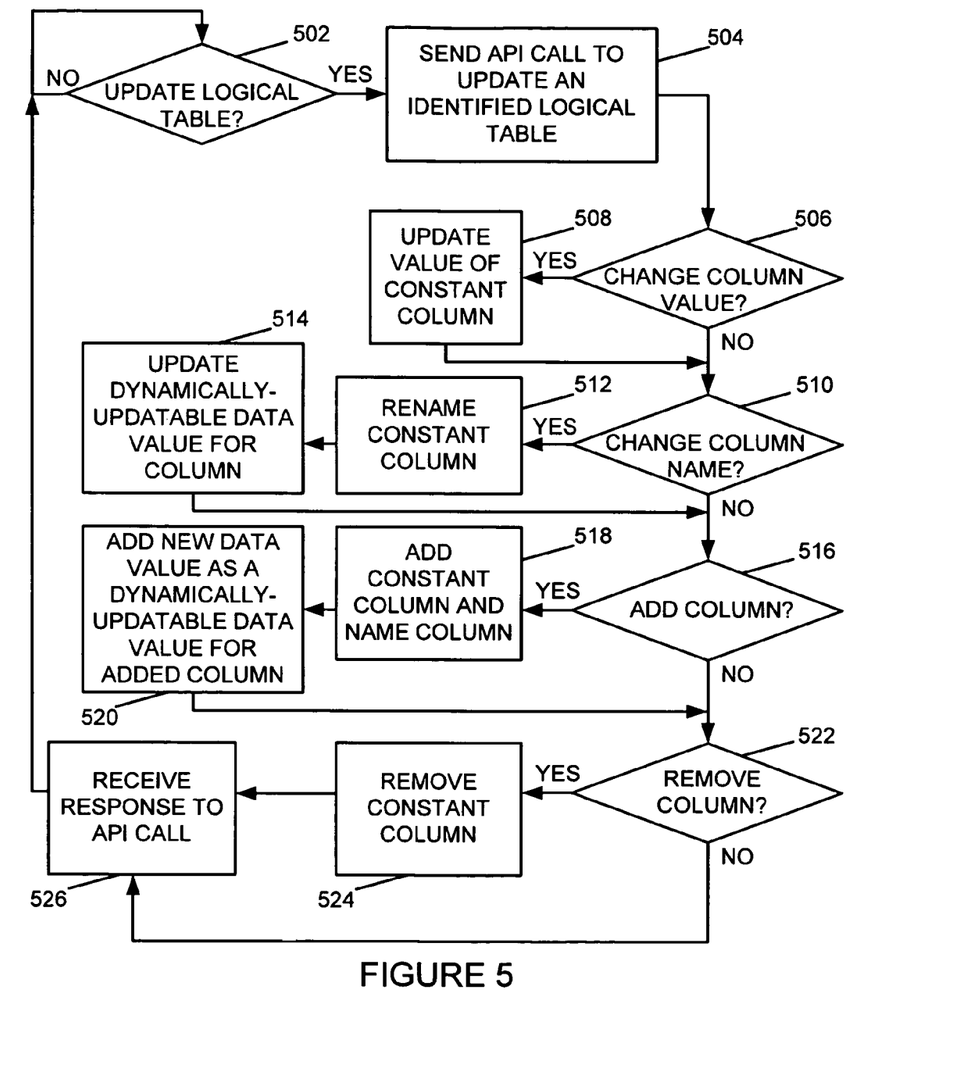
FIG. 5 is a flow chart of an example of an implementation of a process 500 for dynamic constant column and dynamic data value creation, modification, and removal, and for providing database group formation and dissolution according to an embodiment of the present subject matter.

FIGS. 3 through 5 below describe example processes that may be executed by distributed database devices, such as the DBMS_1 102 through the DBMS_N 112, to provide the dynamic context definitions associated with the present subject matter. The example processes may be performed by modules, such as the context module 216 and/or the CPU 200, associated with distributed database devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for providing dynamic context definitions in distributed databases. At block 302, the process 300 receives a database query comprising a logical table identifier at a distributed database node within a distributed network of databases, where the logical table identifier comprises a dynamically-updatable constant column identifier. At block 304, the process 300 filters local logical table definitions based upon the logical table identifier and the dynamically-updatable constant column identifier to identify a local logical table associated with the logical table identifier and the dynamically-updatable constant column identifier. At block 306, the process 300 forms a local query response to the database query comprising data retrieved from a local physical database table mapped by the local logical table in response to identifying the local logical table associated with the logical table identifier and the dynamically-updatable constant column identifier. At block 308, the process 300 responds to the database query, in response to forming the local query response, with the local query response.

FIG. 4 is a flow chart of an example of an implementation of a process 400 for processing dynamic context definitions in distributed databases based upon processing of constant columns associated with local logical table definitions. At decision point 402, the process 400 determines whether a query has been received. As described above, a query is associated with and includes a logical table identifier and a dynamically-updatable constant column identifier. The logical table identifier and the dynamically-updatable constant column identifier may be used for filtering purposes to expedite processing of received queries.

When a matching local logical table with a constant column matching the dynamically-updatable constant column identifier is not defined at distributed database node, processing of the received query may be terminated. For example, a null response may be returned or the query may be rejected. The query may also be forwarded to at least one other distributed database node and query responses may be received from the at least one other distributed database node. This additional processing is not shown within FIG. 4 for ease of illustration purposes. Using the dynamic context definitions of the present subject matter, query processing overhead and processing time may be reduced while providing query context and database grouping within a distributed database system, such as the system 100.

When a determination is made at decision point 402 that a query has been received, the process 400 makes a determination at decision point 404 as to whether to the received logical table identifier references (e.g., matches) a locally-defined logical table. When a determination is made at decision point 404 that the received logical table identifier does not match a locally-defined logical table, the process 400 terminates filtering of the received query and returns to decision point 402 to await receipt of another query. The process 400 may additionally respond to the query with a null response or may reject the received query. The process 400 may also forward the query as described above. Additional processing for these activities is not shown within FIG. 4 for ease of illustration purposes.

When the process 400 makes a determination at decision point 404 that the received logical table identifier matches (e.g., identifies) a locally-defined logical table, the process 400 makes a determination at decision point 406 as to whether the received dynamically-updatable constant column identifier references (e.g., matches) a constant column associated with an identified locally-defined logical table. When a determination is made that the received dynamically-updatable constant column identifier does not match a constant column associated with an identified locally-defined logical table, the process 400 terminates filtering of the received query and returns to decision point 402 to await receipt of another query. The process 400 may additionally respond to the query with a null response or may reject the received query. The process 400 may also forward the query to at least one other distributed database node, as described above. Additional processing for these activities is not shown within FIG. 4 for ease of illustration purposes.

As such, the process 400 provides two levels of filtering for received queries prior to processing the underlying physical database query to expedite query processing for context-based queries in distributed database systems, such as the system 100. The process 400 also limits the number of nodes that process a given query based upon the received logical table identifier and the received dynamically-updatable constant column identifier to provide additional security and processing capabilities for queries within the system 100.

Returning to the description of decision point 406, when a determination is made that the received dynamically-updatable constant column identifier matches a constant column associated with an identified locally-defined logical table, the process 400 queries at least one local physical table mapped by the locally-defined logical table at block 408. At block 410, the process 400 forms a local query response. The local query response includes the data retrieved from the local physical table. At block 412, the process 400 responds with the local query response and returns to decision point 402 to await a new query.

FIG. 5 is a flow chart of an example of an implementation of a process 500 for dynamic constant column and dynamic data value creation, modification, and removal, and for providing database group formation and dissolution. At decision point 502, the process 500 makes a determination as to whether to update any of its locally-defined logical tables. When a determination is made to update any of its locally-defined logical tables, the process 500 makes an API call to send updates for an identified logical table to the database node level at block 504. For ease of illustration purposes, both the logical node processing and the database node processing are illustrated within FIG. 5. Further, as will be described in more detail below, to support logical node independence within the ad-hoc network of databases, the decision to update locally-defined logical tables may be made autonomously by the logical node. The API call may include an indication to perform one or more operations on constant columns associated with defined logical tables. For example, the API call may include an indication to change a dynamically-updatable data value associated with a constant column of a local logical table, an indication to change a column name associated with a constant column of the local logical table, an indication to add a dynamically-updatable constant column to the local logical table, and/or an indication to remove a constant column from the local logical table, among other indications. Furthermore, any of the above-referenced indications may include data elements associated with column names and/or data values specified by the respective indications. Additionally, as described above, as an alternative, dynamic information updating may be performed within a distributed dynamic context definition query as well without departure from the scope of the present subject matter.

At decision point 506, the process 500 makes a determination as to whether the API call includes an indication to change a dynamically-updatable data value associated with a constant column of a locally-defined local logical table. When a determination is made that an indication to change a dynamically-updatable data value associated with the constant column has been received, the process 500 updates the data value associated with the identified constant column at block 508.

When a determination is made that the API call does not include an indication to change a dynamically-updatable data value associated with the a constant column or upon updating the data value associated with the identified constant column, the process 500 makes a determination at decision point 510 as to whether the API call includes an indication to change a column name associated with a constant column of a locally-defined local logical table, a new column name, and a new data value. When a determination is made that the API call includes an indication to change a column name associated with a constant column, a new column name, and a new data value, the process 500 renames the constant column with the received new column name at block 512. The process 500 updates a dynamically-updatable data value for the renamed column with the received new data value at block 514.

When a determination is made that the API call does not include an indication to change a column name associated with a constant column or upon updating the data value associated with the renamed constant column, the process 500 makes a determination at decision point 516 as to whether the API call includes an indication to add a dynamically-updatable constant column to the local logical table, a column name, and a data value. When a determination is made that the API call includes an indication to add a dynamically-updatable constant column to the local logical table, a column name, and a data value, the process 500 adds a constant column to the identified local logical table and names the column with the received column name at block 518. At block 520, the process 500 adds the received data value as a dynamically-updatable data value for the new constant column at block 520. As described, groups may be formed by adding constant columns to logical tables at selected distributed database nodes. Accordingly, the processing at decision point 516 through block 520 may be used to form a database group.

Returning to the description of decision point 516, when a determination is made that the API call does not include an indication to add a dynamically-updatable constant column to a locally-defined logical table or upon updating the data value associated with the new constant column, the process 500 makes a determination at decision point 522 as to whether the API call includes an indication to remove a constant column from a locally-defined logical table. When a determination is made that the API call includes an indication to remove a constant column from a locally-defined logical table, the process 500 removes the identified constant column from the local logical table at block 524. As described, groups may be dissolved by removing constant columns from logical tables at selected distributed database nodes. Accordingly, the processing at decision point 522 through block 524 may be used to dissolve a database group. When a determination is made that the API call does not include an indication to remove a dynamically-updatable constant column from the local logical table or upon removing the constant column, the process 500 transitions back to the logical node level and receives a response to the API call at block 526 and returns to decision point 502 to wait for another determination to update a locally-defined logical table.

As such, the process 500 provides updating of dynamic context definitions in distributed databases based upon querying a logical table definition using an API call to send a query and receive an API response that indicates any updates to local logical table definitions. The process 500 performs additional processing based indications for column creation, modification, or removal. The process 500 also forms and dissolves database processing groups based upon indications within the API call. As such, the process 500 may be used to provide updates for dynamic context definitions within a distributed database system, such as the system 100.

As described above in association with FIGS. 1 through 5, the example systems and processes provide dynamic context definitions in distributed databases. Many other variations and additional activities associated with dynamic context definitions are possible and all are considered within the scope of the present subject matter.

Those skilled in the art will recognize, upon consideration of the above teachings, that certain of the above exemplary embodiments are based upon use of a programmed processor such as CPU 200. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to example embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible example implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
receiving a database query comprising a logical table identifier and a dynamically-updatable constant column identifier at a distributed database node within a distributed network of databases, where the received dynamically-updatable constant column identifier specifies a requested context matching criterion to identify runtime-updatable constant columns with matching context within logical tables with identical logical table names within the distributed network of databases and where the runtime-updatable constant columns are updatable during a system runtime of use of the distributed network of databases without taking distributed database nodes out of service to allow runtime context changes for the logical tables within the distributed network of databases;
filtering local logical table definitions to identify a local logical table with a table name that matches the received logical table identifier and that comprises a locally-defined dynamically-updatable constant column identifier that matches the received dynamically-updatable constant column identifier;
forming a local query response to the database query comprising data retrieved from a local physical database table mapped by the local logical table in response to identifying the local logical table with the table name that matches the received logical table identifier and that comprises the locally-defined dynamically-updatable constant column identifier that matches the received dynamically-updatable constant column identifier;
responding to the database query, in response to forming the local query response, with the local query response; and
making an application programming interface (API) call to generate a query targeting a distributed logical table definition from a logical node level of the distributed database node and receiving an API response, where the API call comprises an indication to a database node level of the distributed database node to change a dynamically-updatable data value associated with a runtime-updatable constant column of the local logical table and a new data value, and further comprising, at the database node level in response to the API call, updating the dynamically-updatable data value associated with the runtime-updatable constant column of the local logical table with the new data value during the system runtime.

2. The method of claim 1, where filtering the local logical table definitions to identify the local logical table with the table name that matches the received logical table identifier and that comprises the locally-defined dynamically-updatable constant column identifier that matches the received dynamically-updatable constant column identifier comprises:
  determining whether the received logical table identifier references a locally-defined logical table; and
  determining, in response to determining that the logical table identifier references the local logical table, whether the received dynamically-updatable constant column identifier references a runtime-updatable constant column associated with the locally-defined logical table.

3. The method of claim 1, further comprising at least one of:
  determining that the received logical table identifier does not reference a locally-defined logical table; and
  determining that the received dynamically-updatable constant column identifier does not reference a runtime-updatable constant column associated with the locally-defined logical table.

4. The method of claim 3, further comprising at least one of rejecting the database query and responding to the database query with a null response based upon determining at least one of that the received logical table identifier does not reference the locally-defined logical table and that the received dynamically-updatable constant column identifier does not reference the runtime-updatable constant column associated with the locally-defined logical table.

5. The method of claim 1, further comprising making an application programming interface (API) call to generate a query targeting a distributed logical table definition from a logical node level of the distributed database node and receiving an API response, where the API call comprises an indication to a database node level of the distributed database node to change a column name associated with a runtime-updatable constant column of the local logical table, a new column name, and a new data value, and further comprising, at the database node level in response to the API call, renaming the runtime-updatable constant column of the local logical table to the new column name during the system runtime and changing a dynamically-updatable data value associated with the runtime-updatable constant column of the local logical table to the new data value during the system runtime.

6. The method of claim 1, further comprising making an application programming interface (API) call to generate a query targeting a distributed logical table definition from a logical node level of the distributed database node and receiving an API response, where the API call comprises an indication to a database node level of the distributed database node to add a runtime-updatable constant column to the local logical table, a column name, and a data value, and further comprising, at the database node level in response to the API call, adding the runtime-updatable constant column to the local logical table during the system runtime, naming the added runtime-updatable constant column using the column name during the system runtime, and adding the data value as a dynamically-updatable data value associated with the added runtime-updatable constant column during the system runtime.

7. The method of claim 6, where the column name comprises a database group name and where adding the runtime-updatable constant column to the local logical table during the system runtime comprises joining a database group associated with the database group name during the system runtime.

8. The method of claim 1, further comprising making an application programming interface (API) call to generate a query targeting a distributed logical table definition from a logical node level of the distributed database node and receiving an API response, where the API call comprises an indication to a database node level of the distributed database node to remove a runtime-updatable constant column from the local logical table and a constant column name, and further comprising, at the database node level in response to the API call, removing the runtime-updatable constant column identified by the constant column name from the local logical table during the system runtime.

9. The method of claim 8, where the constant column name comprises a database group name and where removing the runtime-updatable constant column identified by the constant column name from the local logical table during the system runtime comprises leaving a database group associated with the database group name during the system runtime.

10. A system, comprising:
  a memory adapted to store context information for logical queries; and
  a processor programmed to:
  receive a database query comprising a logical table identifier and a dynamically-updatable constant column identifier at a distributed database node within a distributed network of databases, where the received dynamically-updatable constant column identifier specifies a requested context matching criterion to identify runtime-updatable constant columns with matching context within logical tables with identical logical table names within the distributed network of databases and where the runtime-updatable constant columns are updatable during a system runtime of use of the distributed network of databases without taking distributed database nodes out of service to allow runtime context changes for the logical tables within the distributed network of databases;
  filter local logical table definitions to identify a local logical table with a table name that matches the received logical table identifier and that comprises a locally-defined dynamically-updatable constant column identifier that matches the received dynamically-updatable constant column identifier;
  form a local query response to the database query comprising data retrieved from a local physical database table mapped by the local logical table in response to identifying the local logical table with the table name that matches the received logical table identifier and that comprises the locally-defined dynamically-updatable constant column identifier that matches the received dynamically-updatable constant column identifier;
  store the local query response to the memory;
  respond to the database query, in response to forming the local query response, with the local query response; and
  make an application programming interface (API) call to generate a query targeting a distributed logical table definition from a logical node level of the distributed database node and receiving an API response, where the API call comprises an indication to a database node level of the distributed database node to change a dynamically-updatable data value associated with a runtime-updatable constant column of the local logical table and a new data value, and where the processor is further programmed to, at the database node level in response to the API call, update the dynamically-updatable data value associated with the runtime-updatable constant column of the local logical table with the new data value during the system runtime.

11. The system of claim 10, where, in being programmed to filter the local logical table definitions to identify the local logical table with the table name that matches the received logical table identifier and that comprises the locally-defined dynamically-updatable constant column identifier that matches the received dynamically-updatable constant column identifier, the processor is programmed to:
- determine whether the received logical table identifier references a locally-defined logical table; and
- determine, in response to determining that the logical table identifier references the local logical table, whether the received dynamically-updatable constant column identifier references a runtime-updatable constant column associated with the locally-defined logical table.

12. The system of claim 10, where the processor is further programmed to:
- determine that at least one of:
  - the received logical table identifier does not reference a locally-defined logical table; and
  - the received dynamically-updatable constant column identifier does not reference a runtime-updatable constant column associated with the locally-defined logical table; and
- at least one of:
  - reject the database query; and
  - respond to the database query with a null response.

13. The system of claim 10, where the processor is further programmed to make an application programming interface (API) call to generate a query targeting a distributed logical table definition from a logical node level of the distributed database node and receiving an API response, where the API call comprises an indication to a database node level of the distributed database node to change a column name associated with a runtime-updatable constant column of the local logical table, a new column name, and a new data value, and where the processor is further programmed to, at the database node level in response to the API call, rename the runtime-updatable constant column of the local logical table to the new column name during the system runtime and change a dynamically-updatable data value associated with the runtime-updatable constant column of the local logical table to the new data value during the system runtime.

14. The system of claim 10, where the processor is further programmed to make an application programming interface (API) call to generate a query targeting a distributed logical table definition from a logical node level of the distributed database node and receiving an API response, where the API call comprises an indication to a database node level of the distributed database node to add a runtime-updatable constant column to the local logical table, a column name, and a data value, and where the processor is further programmed to, at the database node level in response to the API call, add the runtime-updatable constant column to the local logical table during the system runtime, name the added runtime-updatable constant column using the column name during the system runtime, and add the data value as a dynamically-updatable data value associated with the added runtime-updatable constant column during the system runtime.

15. The system of claim 14, where the column name comprises a database group name and where, in being programmed to add the runtime-updatable constant column to the local logical table during the system runtime, the processor is programmed to join a database group associated with the database group name during the system runtime.

16. The system of claim 10, where the processor is further programmed to make an application programming interface (API) call to generate a query targeting a distributed logical table definition from a logical node level of the distributed database node and receiving an API response, where the API call comprises an indication to a database node level of the distributed database node to remove a runtime-updatable constant column from the local logical table and a constant column name, and where the processor is further programmed to, at the database node level in response to the API call, remove the runtime-updatable constant column identified by the constant column name from the local logical table during the system runtime.

17. The system of claim 16, where the constant column name comprises a database group name and where, in being programmed to remove the runtime-updatable constant column identified by the constant column name from the local logical table during the system runtime, the processor is programmed to leave a database group associated with the database group name during the system runtime.

18. A system, comprising:
- a memory adapted to store context information for logical queries; and
- a processor programmed to:
  - receive a database query comprising a logical table identifier and a dynamically-updatable constant column identifier at a distributed database node within a distributed network of databases, where the received dynamically-updatable constant column identifier specifies a requested context matching criterion for further filtering of logical tables with identical logical table names within the distributed network of databases;
  - filter local logical table definitions to identify a local logical table with a table name that matches the received logical table identifier and that comprises a locally-defined dynamically-updatable constant column identifier that matches the received dynamically-updatable constant column identifier; and
  - in response to identifying the local logical table with the table name that matches the received logical table identifier and that comprises the locally-defined dynamically-updatable constant column identifier that matches the received dynamically-updatable constant column identifier:
    - form a local query response to the database query comprising data retrieved from a local physical database table mapped by the local logical table;
    - store the local query response to the memory;
    - make an application programming interface (API) call to generate a query targeting a distributed logical table definition from a logical node level of the distributed database node to a database node level of the distributed database node, where the API call comprises a database group name;
    - create, at the database node level in response to the API call, a constant column associated with the local logical table with the database group name as a column name for the constant column to join a database group associated with the database group name;
    - receive an API response at the logical node level of the distributed database node; and
    - respond to the database query with the local query response.

* * * * *